(12) United States Patent
Welch et al.

(10) Patent No.: US 8,176,723 B2
(45) Date of Patent: May 15, 2012

(54) APPARATUS FOR STARTING A STEAM TURBINE AGAINST RATED PRESSURE

(75) Inventors: David E. Welch, Amsterdam, NY (US); Dileep Sathyanarayana, Clifton Park, NY (US); James C. Mondello, Rochester, NY (US); Edward L. Kudlacik, Glenville, NY (US)

(73) Assignee: General Electric Company, Schenectady, NY (US)

( * ) Notice: Subject to any disclaimer, the term of this patent is extended or adjusted under 35 U.S.C. 154(b) by 643 days.

(21) Appl. No.: 12/347,353

(22) Filed: Dec. 31, 2008

(65) Prior Publication Data

US 2010/0162721 A1 Jul. 1, 2010

(51) Int. Cl.
*F02C 6/00* (2006.01)
(52) U.S. Cl. .................................................. 60/39.182
(58) Field of Classification Search ............... 60/39.182, 60/646, 660, 778, 786; 122/7 R
See application file for complete search history.

(56) References Cited

U.S. PATENT DOCUMENTS

| | | | | |
|---|---|---|---|---|
| 3,286,466 A | * | 11/1966 | Stevens | 60/656 |
| 3,392,712 A | * | 7/1968 | Lustenader et al. | 122/459 |
| 3,577,733 A | * | 5/1971 | Manuel et al. | 60/646 |
| 4,208,882 A | * | 6/1980 | Lopes et al. | 60/653 |
| 4,274,438 A | * | 6/1981 | La Coste | 137/551 |
| 4,391,101 A | * | 7/1983 | Labbe et al. | 60/646 |
| 4,875,436 A | * | 10/1989 | Smith et al. | 122/7 R |
| 5,630,314 A | * | 5/1997 | Kojima et al. | 60/39.182 |
| 6,305,398 B1 | * | 10/2001 | Logar et al. | 137/13 |
| 6,767,178 B2 | * | 7/2004 | Staroselsky et al. | 415/1 |
| 8,020,383 B2 | * | 9/2011 | Ooishi et al. | 60/670 |
| 2006/0254280 A1 | * | 11/2006 | Briesch et al. | 60/772 |
| 2007/0113562 A1 | | 5/2007 | Tomlinson et al. | |

* cited by examiner

*Primary Examiner* — Louis Casaregola
*Assistant Examiner* — Phutthiwat Wongwian
(74) *Attorney, Agent, or Firm* — Dority & Manning, P.A.

(57) ABSTRACT

An external steam turbine main steam startup control valve bypass loop is provided to facilitate a full pressure combined cycle rapid response/fast start powerplant. The main steam startup bypass control loop particularly includes a main steam startup bypass control valve, which allows for the implementation of high efficiency, low pressure drop main steam control valve that otherwise would not be able to handle the severe throttling duty during a full pressure steam turbine startup and enhances the controllability of the steam turbine allowing for the high fidelity controls necessary to minimize steam turbine rotor stresses.

15 Claims, 7 Drawing Sheets

APPARATUS FOR STARTING A STEAM TURBINE AGAINST RATED PRESSURE

BACKGROUND OF THE INVENTION

The invention relates generally to combined cycle power systems and more specifically to an apparatus and method for starting a steam turbine against rated pressure.

As is known, combined cycle power systems include one or more gas turbines and heat recovery steam generators (HRSG's) and a steam turbine. Traditional combined cycle system startup procedures include low load holds of the gas turbine and restrictions on the gas turbine loading rate to control the rate of increase in steam temperature. These holds and restrictions contribute to air emissions during the startup event, may increase starting and loading time, and may increase fuel consumption during starting and loading.

More specifically, with combined cycle systems during starting and loading, and prior to the gas turbine achieving full load, the gas turbine is put on a hold until the temperature of the steam generated by the HRSG matches the steam turbine high pressure and intermediate pressure bowl metal temperature and/or the HRSG warms at an allowable rate and/or the HRSG is warmed up to the point of being ready for fuel heating. By holding the gas turbine at low load, the gas turbine operates at a low efficiency and with high exhaust emissions.

Such traditional starting procedures have been tolerated at least in part because in the past, startups were infrequent. With day to night power price swings, however, such startups have become more frequent.

In U.S. Pub. 2007/0113562 Tomlinson et al. (assigned to General Electric Co.) described methods and apparatus to facilitate reduced emissions during starting and loading with respect to emissions with known, traditional combined cycle systems. Such methods and apparatus also facilitated reduced starting and loading time and reduced fuel consumption during the starting and loading event as compared to known, traditional combined cycle systems.

The method includes loading the gas turbine at up to it's maximum rate, and loading the steam turbine at its maximum rate with excess steam bypassed to the condenser while maintaining the temperature of steam supplied to the steam turbine at a substantially constant temperature from initial steam admission into the steam turbine until all steam generated by the heat recovery steam generator is being admitted to the steam turbine while the gas turbine operates at up to maximum load.

Figure 1:
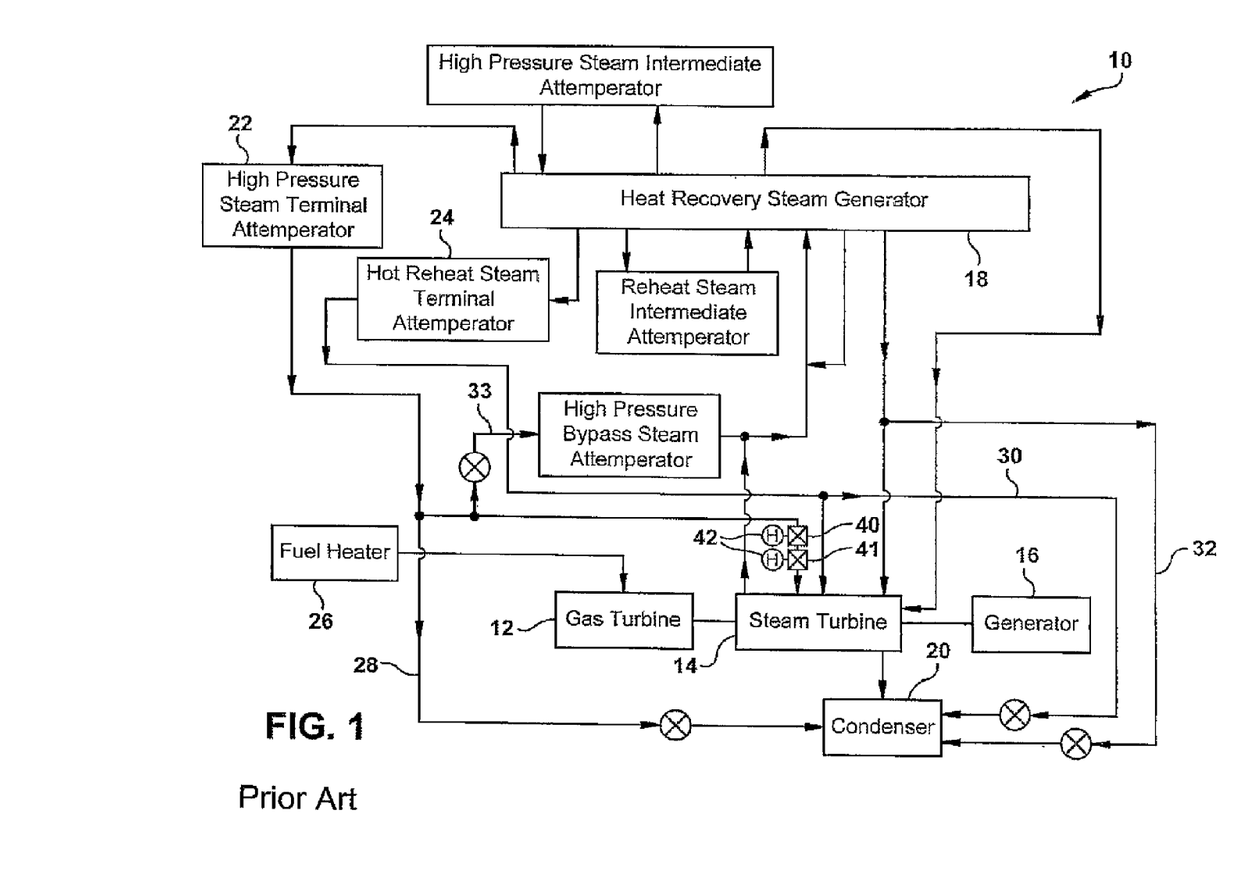
FIG. 1 is a schematic illustration of an exemplary combined cycle power system 10 adapted for implementing a fast startup.

FIG. 1 is a schematic illustration of a combined cycle power system 10 adapted for implementing a fast startup. As is known, system 10 includes a gas turbine 12 and a steam turbine 14 coupled to a generator 16. Steam turbine 14 is connected by multiple conduits to a heat recovery steam generator (HRSG) 18 and its exhaust is connected to a condenser 20.

The system 10 includes attemperators 22 at the discharge terminal of the high pressure superheater and attemperator 24 located at the discharge terminal of the reheater in HRSG 18. HRSG 18 may have a once-through or a drum type evaporator, which is capable of tolerating daily startup and loading of gas turbine 12 at an optimized rate with normal life span and maintenance.

During startup and loading the gas turbine and steam turbine, attemperators 22 and 24 operate to reduce the temperature of high pressure and hot reheat steam generated by HRSG 18 that is supplied to steam turbine 14. Particularly, attemperator 22 facilitates satisfying steam turbine criteria for steam temperature to high pressure bowl metal temperature matching with gas turbine 12 at any load. The temperature of the hot reheat steam for admission to the steam turbine intermediate pressure section is controlled to the steam to metal temperature matching criteria by the reheat steam terminal attemperator 24.

System 10 further includes bypass paths 28, 30 and 32 from HRSG 18 to condenser 20 and bypass path 33 from the high pressure steam line to the cold reheat steam piping that provide alternate high pressure steam flow paths while the steam turbine admission valves 40 are modulated to load the steam turbine at its fastest allowable rate. Bypass paths 28 and 33 include valves that are modulated to control the pressure of the high pressure steam and the rate of increase of high pressure steam pressure. Bypass path 30 provides an alternate path for the hot reheat steam while the intermediate pressure control valve is modulated during steam turbine loading. Bypass path 30 includes a valve that is modulated to control the reheat steam pressure while the steam turbine intermediate pressure control valve is modulated during steam turbine loading. Steam bypass path 32 provides an alternate path for the low pressure steam while the steam turbine low pressure admission valve is modulated during steam turbine loading. This bypass arrangement allows for 100% or greater steam generation by HRSG 18 with gas turbine 12 at up to maximum load with steam the turbine at any load from no load to a maximum load.

In addition, a steam turbine loading procedure is utilized that holds constant steam temperature from initial steam admission until all of the steam generated by the HRSG with gas turbine 12 at up to maximum load is being admitted and steam turbine loading can be performed at any gas turbine load up to maximum load. This maybe accomplished by maintaining the setpoint temperature of the high pressure steam terminal attemperator 22 at either the lowest allowable temperature (for example at approximately 700 F.) or if the bowl metal temperature is higher than the minimum, slightly above the measured temperature of the steam turbine high pressure bowl metal temperature when high pressure steam is initially admitted to the steam turbine. Likewise, the hot reheat steam terminal attemperator 24 setpoint is maintained at either the lowest allowable temperature or if the steam turbine intermediate pressure bowl metal temperature is above the minimum when steam admission is initiated, at a temperature at or slightly above the bowl metal temperature. This startup procedure facilitates steam turbine loading while facilitating minimum stress resulting from turbine shell or rotor heating.

Main steam control valve 40 is provided to steam turbine 14 for control of flow to the turbine. Main steam stop valve 41 is provided for positive isolation of steam to the turbine and quick closing for steam turbine protection. After all steam flow is being admitted to steam turbine 14, the steam temperature is raised at a rate compatible with allowable steam turbine stress and differential expansion to achieve normal steam turbine output and efficiency. Main steam control valve 40 and main steam stop valve 41 may be incorporated within a single body. Terminal attemperators 22 and 24 provide control of steam temperature during this steam turbine startup.

Traditionally, main stop and control valves for combined cycle applications have been designed for to the following requirements: 1) fast closure for turbine protection from overspeed; 2) low pressure drop for optimized turbine output and performance; and 3) light duty short duration throttling associated with starting up the steam turbine. Therefore, throttling requirements were relatively benign.

For implementation of rapid startup profile of Tomlinson et al. the main control valve will be required to perform heavy duty throttling against full rated upstream pressure. Past experience on applications with less severe, but still significant throttling for combined cycle main steam control valves (MSCVs) has been less than favorable. Both the reliability and low load controllability of these high performing MSCV's have been issues.

Accordingly, there is a need to provide throttling capability for severe pressure drops while maintaining low load control for steam to the steam turbine. Further, such an apparatus must maintain rapid closure for turbine protection and low pressure drop for turbine performance.

BRIEF DESCRIPTION OF THE INVENTION

The present invention relates to an apparatus and method for improving the transportation and manipulation of a stator bar particularly during a liquid cooled stator rewind procedure.

Briefly in accordance with one aspect a combined-cycle power generation system is provided. The system includes an electrical generator, a gas turbine coupled to the electrical generator, and a steam turbine coupled to the electrical generator. The system further includes a heat recovery steam generator adapted for supplying steam to the steam turbine, and at least one attemperator coupled to the heat recovery steam generator. Additionally, the system includes a main steam control valve adapted for controlling admission of steam to the steam turbine during normal operation of the steam turbine and a main steam startup control bypass loop, adapted for controlling admission of steam to the steam turbine during fast startup.

In accordance with a second aspect of the present invention, an apparatus is provided, which is adapted for controlling steam flow to a steam turbine in a fast startup of a combined cycle plant. The combined cycle plant includes a gas turbine, a heat recovery steam generator adapted for supplying steam to the steam turbine, at least one attemperator adapted to controlling temperature of steam to a steam turbine, and at least one bypass path to a condenser adapted for controlling temperature of the steam to the steam turbine. The apparatus includes a startup bypass control loop including a main steam bypass stop valve and a main steam bypass control valve.

Another aspect of the present invention provides a method for rapid starting of a combined cycle power generation system. The system includes a gas turbine, a steam turbine; a heat recovery steam generator that receives exhaust heat from said gas turbine and is equipped with attemperators at the discharge terminals of the high pressure superheater and reheater and is connected to the steam turbine; a condenser connected to the steam turbine; and bypass paths from the heat recovery steam generator to the condenser and from the high pressure steam piping to the hot reheat steam piping; and the main steam piping includes a main steam control valve and a main steam bypass control valve.

The method includes loading the gas turbine at up to it's maximum rate while maintaining steam temperature of steam supplied to the steam turbine at substantially constant temperature from initial steam admission into the steam turbine until all steam generated by the heat recovery steam generator with the gas turbine operating at up to maximum load is being admitted to the steam turbine through the main steam startup bypass valves. The method also includes modulating the flow of steam through the bypass paths so as to control the high pressure steam pressure, reheat pressure and low pressure steam pressure from the heat recovery steam generator and provide alternate paths for the steam while the main steam startup bypass control valves are modulated during loading.

Control of the steam admission to the steam turbine from the main steam bypass control valve is shifted to the main steam control valve. After all steam flow is admitted to the steam turbine, then steam temperature is raised a rate compatible with allowable steam turbine stress and differential expansion to achieve normal steam turbine output and efficiency.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein:

FIGS. 3A and 3B illustrate an arrangement for the bypass valves for the main steam stop valve and cutout valve;

DETAILED DESCRIPTION OF THE INVENTION

The following embodiments of the present invention have many advantages, including facilitating implementation of a rapid response startup in combined cycle gas turbine plants.

This invention pertains to the addition of an external steam turbine main steam startup control valve bypass loop used to facilitate a full pressure combined cycle rapid response/fast start power plant. The main steam startup control bypass loop particularly includes a main steam startup control bypass valve, which accomplishes the following: 1) allows for the implementation of high efficiency, low pressure drop MSCV's that otherwise would not be able to handle the severe throttling duty during a full pressure steam turbine startup, and 2) enhances the controllability of the steam turbine allowing for the high fidelity controls necessary to minimize ST rotor stresses. The main advantage of this type of main steam valving configuration is that it facilitates the decoupling of a gas turbine (GT) from the steam turbine (ST) during a combined cycle startup. By decoupling the ST from the GT, the GT has the ability to start up faster resulting in greatly reduced GT startup emissions and increased customer revenue. In the event that an in-service combined cycle plant is converted to make it a fast start/rapid response power plant, the use of these startup bypass valves may be added to provide the control fidelity and robust throttling required for a full pressure ST starting and loading that must occur to fully decouple the ST from the GT.

An important feature of this invention is the addition and/or application of startup control bypass loop to a combined cycle application, for the purpose of more reliable and controlled starting loading characteristics when operating against full rated operating conditions. The components included in an embodiment of this invention are a fast closing in fine bypass stop valve, a linear bypass valve, and an inline basket type or y-pattern steam strainer.

The arrangement allows for the MSCV's to be designed for optimum performance, while providing the reliability and starting and loading characteristics required to accurately control the turbine. Without this invention, robust features within the MSCV design would be required leading to valve designs that inevitably result in higher pressure loss characteristics that are not acceptable.

Figure 2:
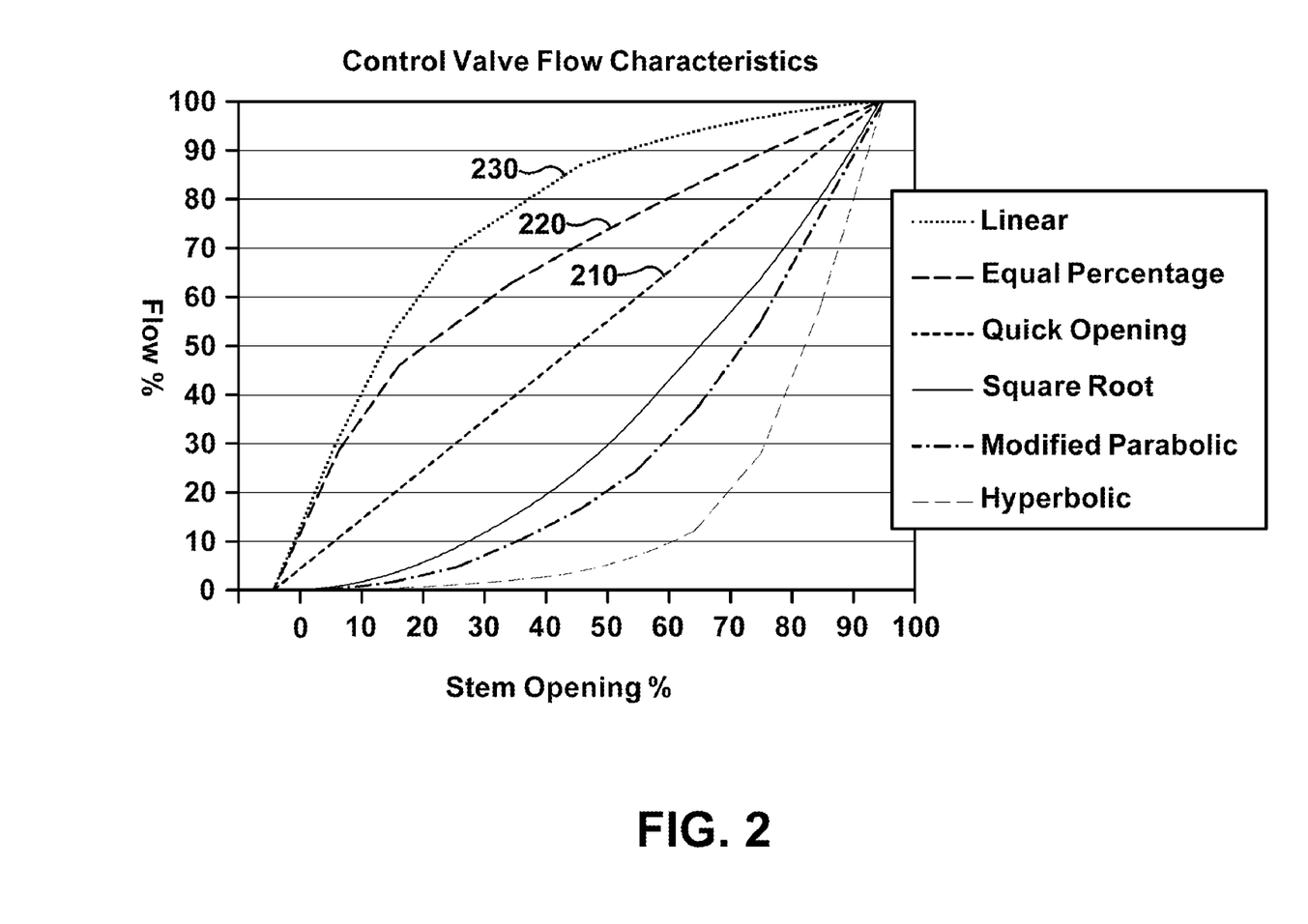
FIG. 2 illustrates an exemplary representation of a linear flow characteristic for the startup control bypass valve.

The startup control bypass loop is added around the existing MSCV. While the existing MSCV is expected to function as a quick closing stop valve for turbine protection and a throttling valve for control of steam admission to the ST turbine loaded operation, it is also expected to provide control high throttling control for low levels of steam admission during gas turbine warmup. An embodiment of the inventive startup control bypass loop includes a fast-acting startup bypass stop valve (SBSV) for turbine protection. The startup bypass control valve (SBCV) provides enhanced flow control with a linear Cv characteristic vs. valve stroke for enhanced control during a rapid startup. FIG. 2 illustrates an exemplary representation of a linear flow characteristic 210 for the startup bypass control valve. Other representative flow characteristics that may be employed for a startup control bypass valve may include equal percentage characteristics 220 and quick opening characteristics 230. The SBSV and the SBCV may each include a single acting hydraulic actuator for opening and rely on mechanical spring closure. A basket strainer upstream from the fast-acting main s stop valve and the startup bypass control valve protects the valve combination from foreign materials that could degrade their performance and reliability of operation. The basket strainer may alternatively be included within the SBCV valve or the SBSV valve.

Figure 3A:
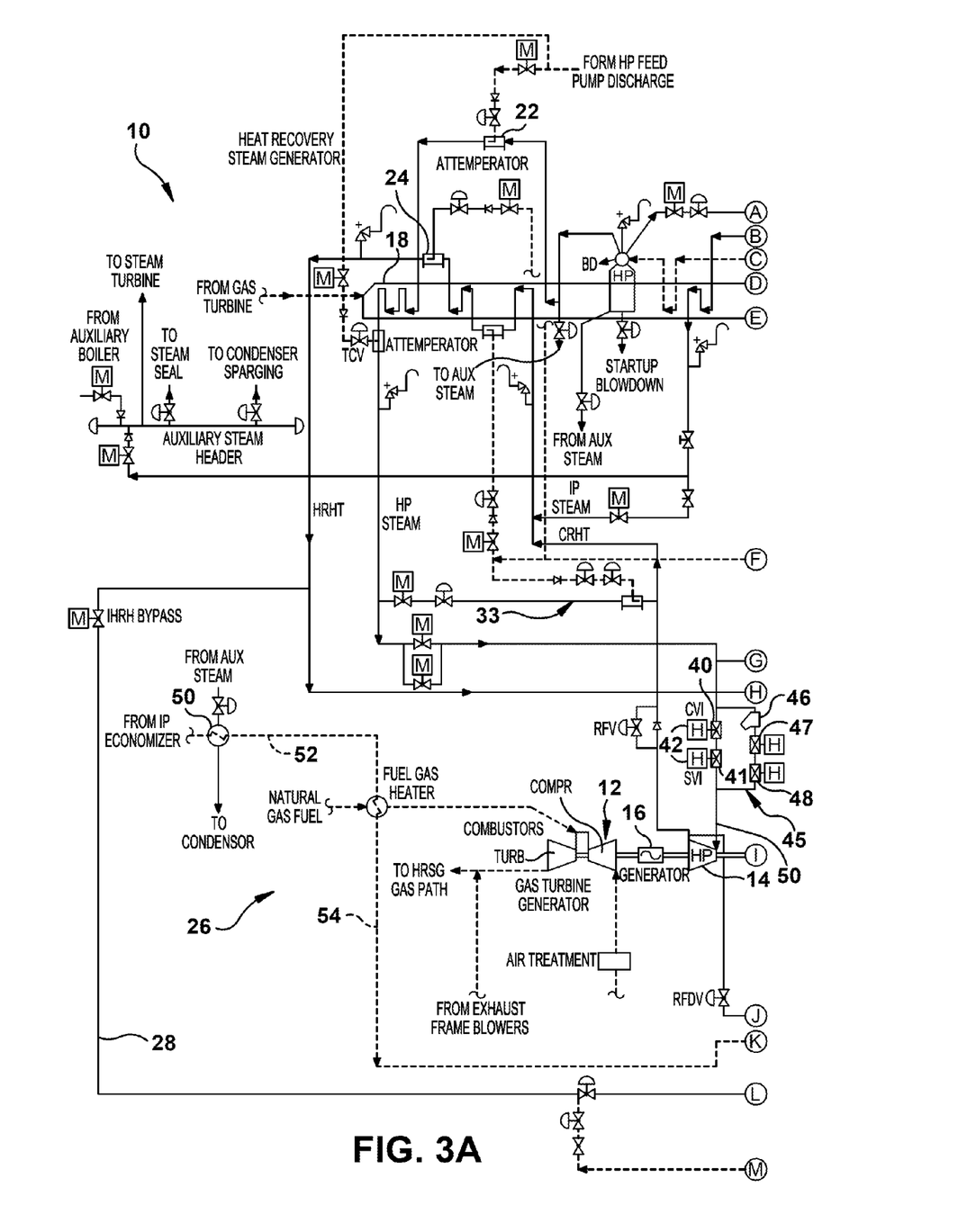
FIGS. 3A and 3B are a more detailed schematic representation of an exemplary combined cycle power system incorporating an embodiment of a startup control bypass loop.
Figure 3B:
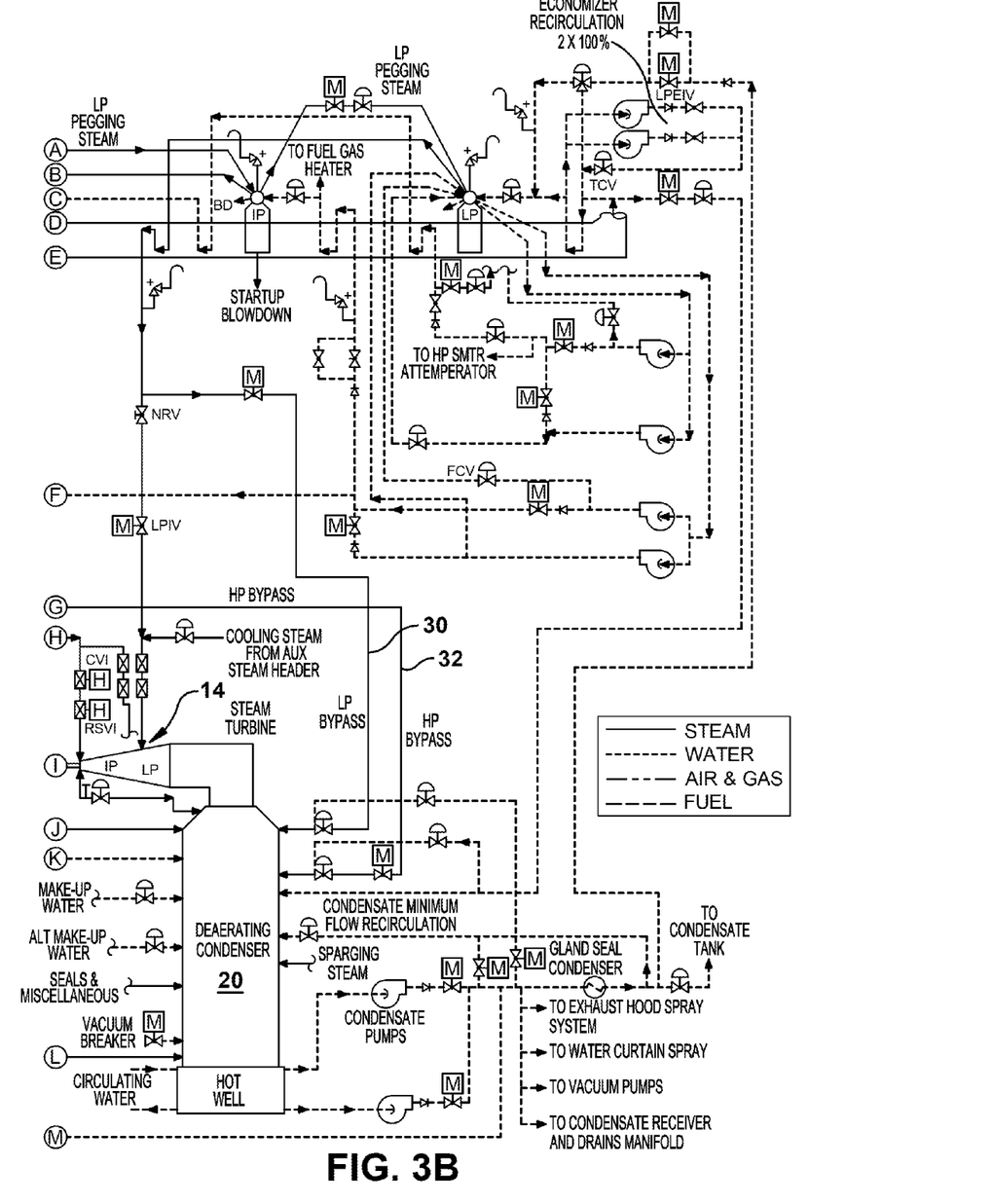

FIGS. 3A and 3B are a more detailed schematic representation of an exemplary combined cycle power system incorporating an embodiment of a startup control bypass loop. Exhaust heat from gas turbine 12 may be provided to heat recovery steam generator (HRSG) 10. HRSG 10 may provide steam to steam turbine 14 through attemperator 22. Some of the steam may be diverted through HP bypass 32 to deaerating condenser 20. At inlet to steam turbine 14, the main steam control valve 40 and the main steam stop valve 41 are positioned, adapted for control of the steam turbine during fully loaded operation. Main steam control valve 40 and the main steam stop valve 41 may include hydraulic controls 42, with hydraulic control signals provided from a turbine control system (not shown). Main steam stop valve 41 provides a rapid-closing feature and positive isolation of steam from the steam turbine 14. Main steam control valve 42 provides steam admission according to the control of the turbine control system (not shown). The startup bypass loop 45 includes startup bypass stop valve 47 and startup bypass control valve 48. The startup bypass loop 45 may further include startup bypass strainer 46. Startup bypass strainer 46 may alternatively be included within one of the startup bypass stop valve 47 and startup bypass control valve 48. Controls for the startup bypass stop valve and the startup bypass control valve may be provided with a hydraulic actuator employing signals from the turbine control system (not shown), The valves and strainer of the startup control bypass loop may be supported from existed steam piping. As shown in FIG. 3A, the main steam startup bypass control loop 45 has an inlet portion coupled to a portion of the high pressure steam line and a second portion coupled to another portion of the high pressure steam line, and the main steam control valve 40 is disposed on the high pressure line between the inlet portion and the other portion.

Figure 4:
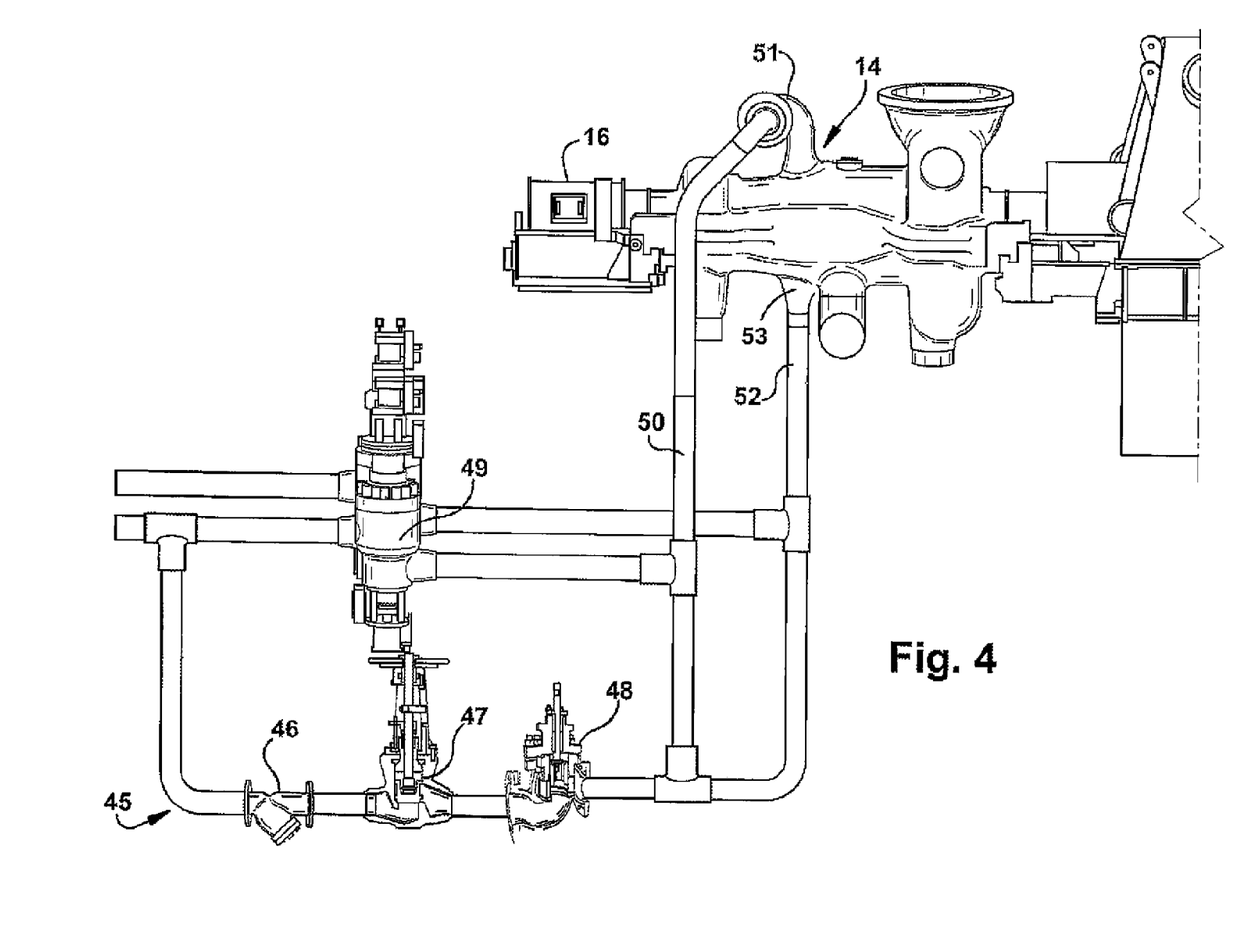
FIG. 4 illustrates an elevation view for an embodiment of an arrangement for startup bypass control loop.

FIG. 4 illustrates an elevation view for an embodiment of an arrangement for startup bypass control loop supplying a steam turbine. Steam turbines, depending on size and other factors may include more than one steam inlet. The steam turbine 14, as illustrated, includes dual steam inlets 51, 53. Consequently, dual steam piping 50, 52 is provided to service the dual inlets. Further in this configuration, existing MSBV 41 and MSCV 42 may be included within a single body 49. Thus MSBV/MSCV 49 may supply a first dual steam piping line 50 of the two dual steam piping lines. A second existing MSBV/MSCV 49 supply the second dual steam piping line 52.

Startup control bypass loop 45 is paralleled with the dual MSBV/MSCV 49. Startup control bypass loop 45 may include strainer 46, startup bypass stop valve 47 and startup bypass control valve 48. Outlet piping downstream of startup bypass control valve 48 may include dual steam piping 50, 52 supplying dual steam inlets 51, 53 to steam turbine 14. Steam turbine 14 may be connected via a common shaft to electrical generator 16.

A method for a fast startup may include loading the gas turbine at up to its maximum rate. Then maintaining steam temperature of steam supplied to the steam turbine at substantially constant temperature from initial steam admission into the steam turbine until all steam generated by the heat recovery steam generator with the gas turbine operating at up to maximum load is being admitted to the steam turbine by controlling with the main steam bypass control valve. Further the method includes modulating the flow of steam through the bypass paths to the condenser so as to control the high pressure steam pressure, reheat pressure and low pressure steam pressure from the heat recovery steam generator and provide alternate paths for the steam while the steam turbine bypass control valves are modulated during loading. After a predesignated amount of steam has been admitted to the steam turbine, raising the steam temperature at a rate compatible with allowable steam turbine stress and differential expansion to achieve normal steam turbine output and efficiency. Steam flow to the steam turbine is shifted from the main steam bypass control valve to the main steam control valve.

Figure 5:
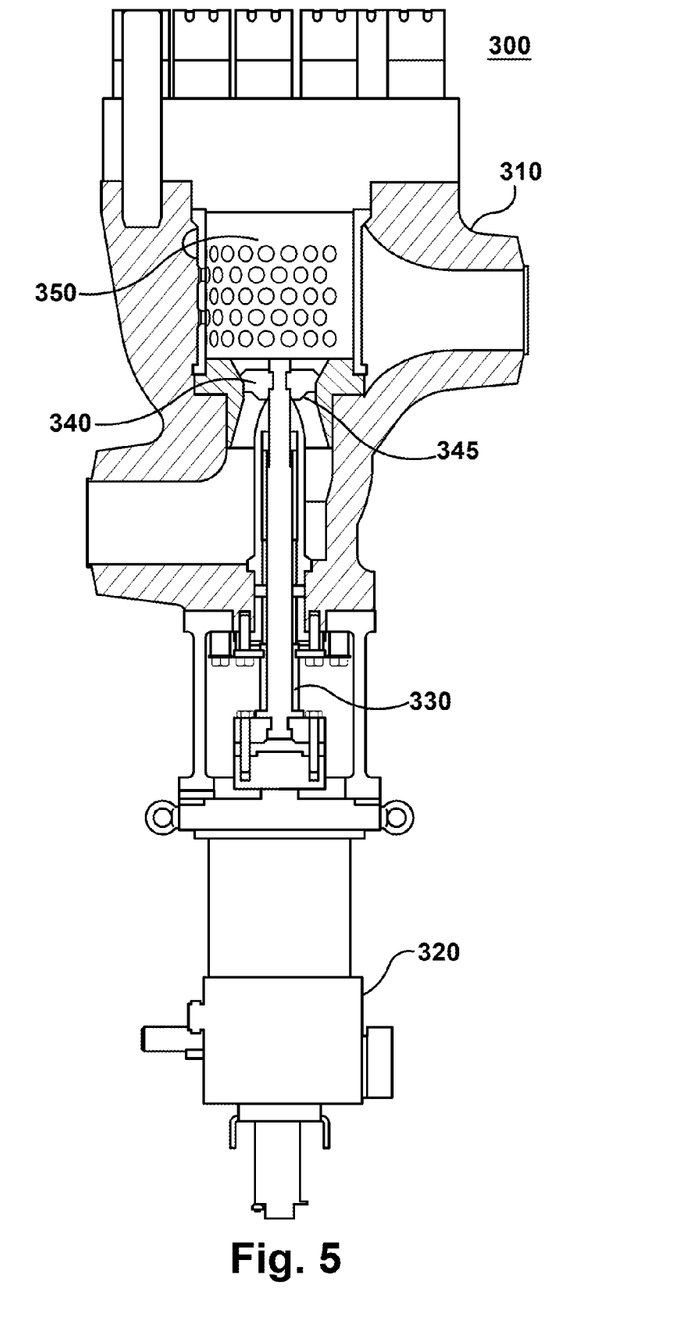
FIG. 5 illustrates a cross-sectional view of an embodiment for the startup bypass stop valve.

FIG. 5 illustrates a cross-sectional view of an embodiment for the startup bypass stop valve. The startup bypass stop valve includes a body 310 adapted for rapid and positive closing in response to a steam turbine, generator or other fault. Control head 320 may include spring system (not shown) for forcing control stem 330 to seat disc 340 closed against 345 in the absence of a hydraulic control signal (not shown) from the turbine control system holding the valve open. Internal strainer 350 is provided in this embodiment to prevent foreign materials from fouling or damaging seating surfaces in the stop valve or in downstream components.

Figure 6:
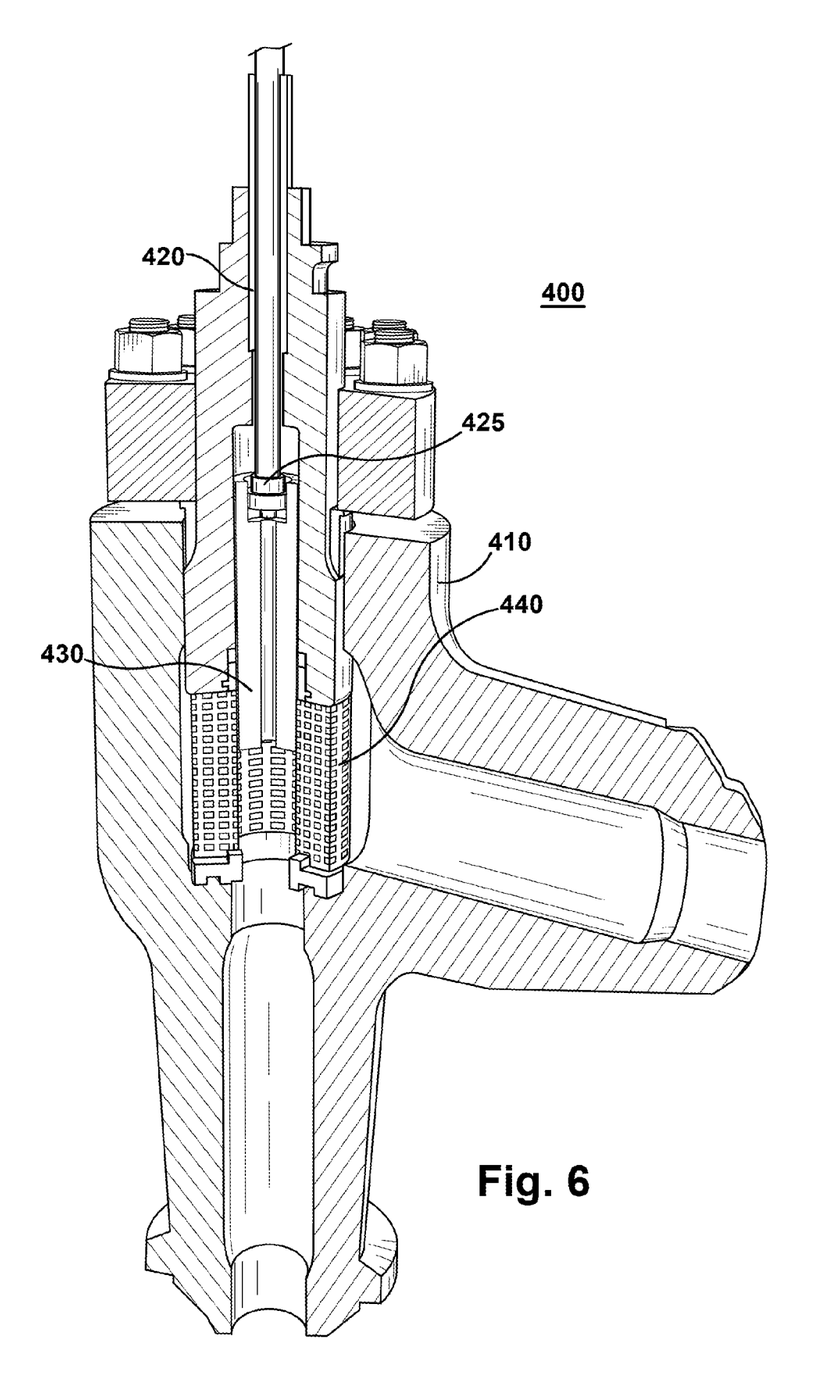
FIG. 6 illustrates a cross-sectional view of an embodiment for the startup bypass control valve.

FIG. 6 illustrates a cross-sectional view of one embodiment for the startup bypass control valve. Startup bypass control valve 400 includes body 410. Control stem 420 is operated at an upper end by hydraulic controls (not shown) for opening against spring closing (not shown). Control stem disc 425 operates control sleeve 430 within stacked disc 440 to control steam flow through body 410 according to a generally linear flow characteristic.

While various embodiments are described herein, it will be appreciated from the specification that various combinations of elements, variations or improvements therein may be made, and are within the scope of the invention.

The invention claimed is:

1. A combined-cycle power generation system comprising: an electrical generator, a gas turbine coupled to the electrical generator, a steam turbine coupled to the electrical generator, a heat recovery steam generator adapted for supplying steam to the steam turbine, at least one attemperator coupled to the heat recovery steam generator and in fluid communication with the steam turbine via a high pressure steam line, a main steam startup bypass control loop having an inlet portion coupled to a portion of the high pressure steam line and a second portion coupled to another portion of high pressure stream line, the main steam startup bypass control loop adapted for controlling admission of steam to the steam turbine during fast startup; and a main steam control valve disposed on the high pressure line between the inlet portion and the another portion, the main steam control valve adapted for controlling admission of steam to the steam turbine during normal operation of the steam turbine.

2. The combined-cycle power generation system according to claim 1, the main steam startup control bypass loop comprising: a bypass control valve; main steam piping connected from upstream of the main steam control valve to an inlet of the bypass control valve; and steam piping connected from an outlet of the bypass control valve to downstream of the main steam control valve.

3. The combined-cycle power generation system according to claim 2, wherein the steam piping from the outlet of the bypass control valve is configured for at least one of single entrance or dual entrance to the steam turbine.

4. The combined-cycle power generation system according to claim 2, further comprising: a bypass stop valve upstream from the bypass control valve in the main steam startup control bypass loop.

5. The combined-cycle power generation system according to claim 2, further comprising: a strainer upstream from the bypass control valve.

6. The combined-cycle power generation system according to claim 4, wherein the bypass stop valve is biased closed.

7. The combined-cycle power generation system according to claim 2, wherein the bypass control valve is biased closed.

8. The combined-cycle power generation system according to claim 7, wherein flow through the bypass control valve is linear over a full range of operation.

9. An apparatus adapted for controlling steam flow to a steam turbine in a fast startup of a combined cycle plant including a gas turbine, a heat recovery steam generator adapted for supplying steam to the steam turbine, at least one attemperator adapted to controlling temperature of steam to a steam turbine via a high pressure steam line, and at least one bypass path to a condenser adapted for controlling temperature of the steam to the steam turbine, the apparatus comprising: a startup bypass control loop including an inlet portion coupled to a portion of the high pressure steam line and a second portion coupled to another portion of the high pressure steam line, a main steam bypass stop valve and a main steam bypass control valve disposed between the inlet portion and the second portion.

10. The apparatus adapted for controlling steam flow to a steam turbine in a fast startup of a combined cycle plant according to claim 9, wherein flow through the main steam bypass control valve is linear.

11. The apparatus adapted for controlling steam flow to a steam turbine in a fast startup of a combined cycle plant according to claim 9, wherein the main steam bypass control valve is biased shut on loss of hydraulic control.

12. The apparatus adapted for controlling steam flow to a steam turbine in a fast startup of a combined cycle plant according to claim 9, wherein the main steam bypass stop valve is biased shut on loss of hydraulic control.

13. The apparatus adapted for controlling steam flow to a steam turbine in a fast startup of a combined cycle plant according to claim 9, wherein the startup bypass control loop further comprises a strainer upstream from the main steam startup control bypass valve.

14. The apparatus adapted for controlling steam flow to a steam turbine in a fast startup of a combined cycle plant according to claim 9, further comprising: a main steam piping connected from upstream of the main steam control valve to an inlet of the main steam bypass control valve and steam piping connected from an outlet of the main steam bypass control valve to downstream of the main steam control valve.

15. The apparatus adapted for controlling steam flow to a steam turbine in a fast startup of a combined cycle plant according to claim 14, wherein the main steam piping from the outlet of the main steam bypass control valve is configured for at least one of a single entrance or a dual entrance to the steam turbine.

* * * * *